US011285856B2

(12) United States Patent
Satvilkar et al.

(10) Patent No.: US 11,285,856 B2
(45) Date of Patent: Mar. 29, 2022

(54) VEHICLE CARPET SYSTEMS AND METHODS OF INSTALLING SAME

(71) Applicant: Honda Motor Co., Ltd., Tokyo (JP)

(72) Inventors: Prakalp Arun Satvilkar, Marysville, OH (US); Aruna Kumara, Marysville, OH (US); Brian D. Large, Hilliard, OH (US); Sarah J. Huth, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/939,931

(22) Filed: Jul. 27, 2020

(65) Prior Publication Data

US 2022/0024367 A1    Jan. 27, 2022

(51) Int. Cl.
*B60N 3/04* (2006.01)
*B62D 25/20* (2006.01)

(52) U.S. Cl.
CPC ............ *B60N 3/048* (2013.01); *B60N 3/046* (2013.01); *B62D 25/2072* (2013.01); *Y10T 428/24198* (2015.01)

(58) Field of Classification Search
None
See application file for complete search history.

(56) References Cited

U.S. PATENT DOCUMENTS 5,387,390 A    2/1995   Kornylo
6,537,641 B1 *  3/2003   Kroll ...................... B60N 3/046
                                                          296/208
7,658,984 B2    2/2010   Allison et al.
8,091,684 B2    1/2012   Juriga
8,574,700 B2   11/2013   Hattori
8,579,347 B2   11/2013   Filipp
9,321,412 B2    4/2016   Ikeji et al.
9,586,380 B2    3/2017   Burgin et al.

FOREIGN PATENT DOCUMENTS

DE            4326175 A1 *  2/1994   ............. B62D 25/02

OTHER PUBLICATIONS

Tmachine translation of DE4326175A1 retrieved Apr. 29, 2021. (Year: 2021).*

* cited by examiner

*Primary Examiner* — Alexander S Thomas

(74) *Attorney, Agent, or Firm* — Armstrong Teasdale LLP

(57) ABSTRACT

A method and a vehicle carpeting system includes a floor pan that includes a forward end, an opposing aft end, a first lateral side, a second lateral side, and a floor pan body extending therebetween. An A-pillar is formed along the first lateral side and the second lateral side of the floor pan, a B-pillar is formed along the first lateral side and the second lateral side of the floor pan aft of the A-pillar. A ductway extends along the first lateral side from the A-pillar past the B-pillar. The vehicle carpeting system also includes a carpet structure at least partially covering the floor pan and extending from the first lateral side to the second lateral side. The vehicle carpeting system further includes a door seal that includes a lip that extends over a lateral side of the carpet structure.

10 Claims, 8 Drawing Sheets

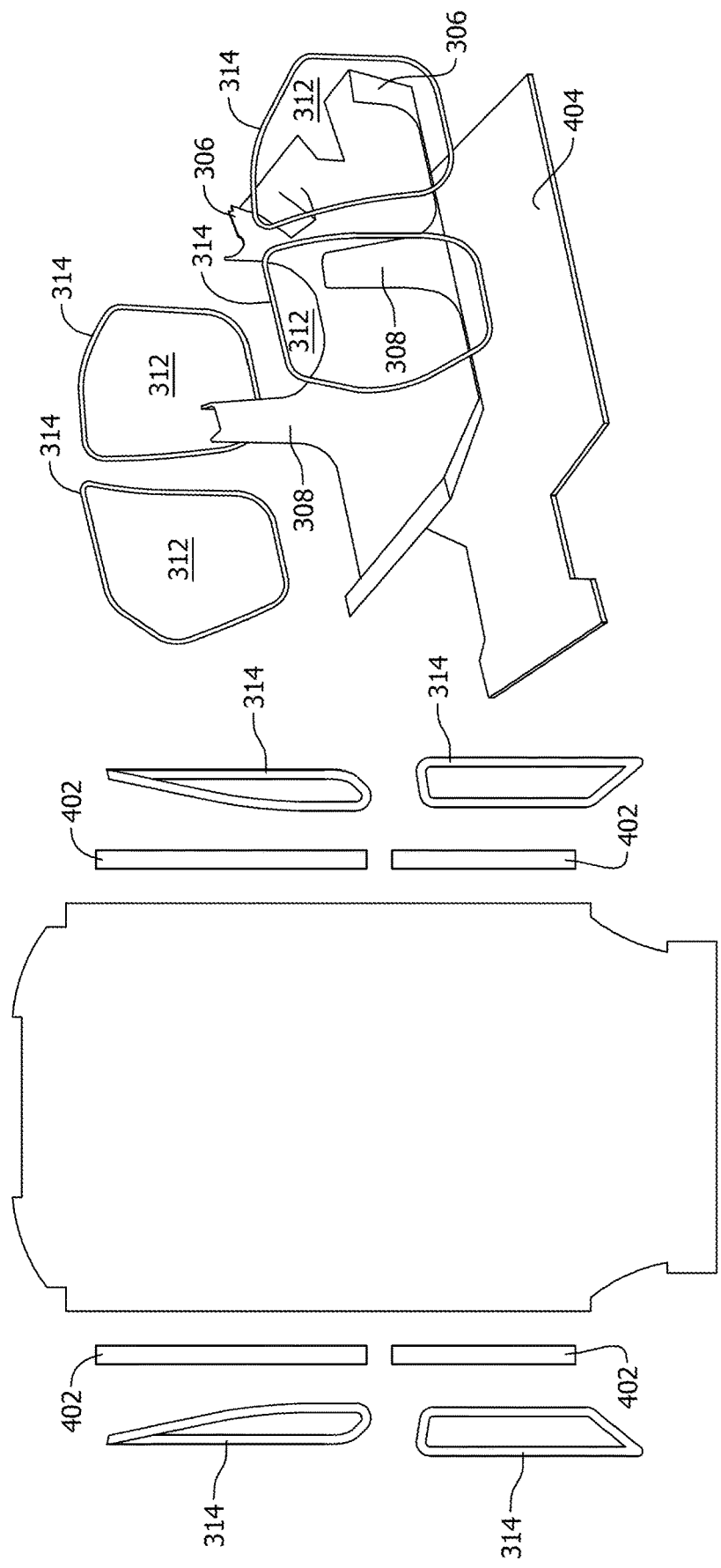

VEHICLE CARPET SYSTEMS AND METHODS OF INSTALLING SAME

BACKGROUND

The present disclosure generally relates to vehicle carpet systems, and more particularly to maintaining an appearance of carpet system trim components. In automobiles and other similar vehicles, electrical services are often routed through the passenger compartment through ductways extending on or under the floor of the vehicle. In one known automobile, the ductway extends along the sides of the floor adjacent to the door frames. Over time, this configuration has evolved to include a wide plastic step member at the sill of the door frame. Because the step is formed of a relatively soft material, such as, but not limited to a plastic material, gravel or pebbles captured by a user's shoes tend to mar the surface of the step making it unsightly, and thus, adversely affecting the perception of quality by customers.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vehicle carpeting system includes a floor pan that includes a forward end, an opposing aft end, a first lateral side, a second lateral side, and a floor pan body extending therebetween. An A-pillar is formed along the first lateral side and the second lateral side of the floor pan, a B-pillar is formed along the first lateral side and the second lateral side of the floor pan aft of the A-pillar. A ductway extends along the first lateral side from the A-pillar past the B-pillar. The ductway is formed from a U-shaped stiffened duct member coupled to the floor pan. The vehicle carpeting system also includes a carpet at least partially covering the floor pan and extending from the first lateral side to the second lateral side. The vehicle carpeting system further includes a door seal that includes a lip that extends over a lateral side of the carpet.

In another aspect, a method of installing carpet in a vehicle includes coupling an elongate stiffened duct member along a lateral edge of a floor pan of the vehicle, laying a carpet structure having a first lateral edge and a second lateral edge across a width of the floor pan and over the stiffened duct member, and extending the carpet structure from a first lateral edge of the floor pan to an opposing second lateral edge of the floor pan. The method also includes installing a door seal around a periphery of each of a plurality of door openings in a body of the vehicle, the door seal having a resilient lip extending toward an interior of the vehicle and configured to engage a respective lateral edge of the carpet structure and securing the first lateral edge and the second lateral edge of the carpet structure using the respective door seal lips.

In yet another aspect, a vehicle carpet system includes a floor pan that includes a first lateral edge and an opposing second lateral edge, each of the first lateral edge and the second lateral edge including a respective first flange and second flange. The vehicle carpet system includes at least one door seal. Each at least one door seal is associated with a respective door opening of the vehicle and is formed of a U-shaped cavity, a resilient lip extending from an outer surface of the U-shaped cavity, and a seal chamber extending from the U-shaped cavity. An opening of the U-shaped cavity at least partially is covered by a resilient latch. The door seal is coupled to respective flanges of the first lateral edge and the second lateral edge via the U-shaped cavity and resilient latch. The vehicle carpet system further includes a carpet structure having a first lateral carpet edge and an opposing second lateral carpet edge. The carpet structure extends across the floor pan from the U-shaped cavity of the first lateral edge of the floor pan to the U-shaped cavity of the second lateral edge of the floor pan.

Various refinements exist of the features noted above in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

FIGS. 1-9 show exemplary embodiments of the methods and system described herein.

FIG. 1 is a perspective view of a portion of an exemplary vehicle floor pan that may be used with a prior art vehicle carpet system described herein.

FIG. 2 is an elevational view of first lateral side of the floor pan shown in FIG. 1 looking forward that may be used with the prior art vehicle carpet system.

FIG. 3 is a perspective view of a driver's side portion of a vehicle where the vehicle carpet system may be used.

FIG. 4 is a plan view of the floor pan shown in FIG. 3 with exploded portions, including door sill stiffeners and door seals shown in FIG. 3.

FIG. 5 is a perspective view of the floor pan shown in FIG. 3 and a portion of a lower body of the vehicle.

FIG. 6 is a perspective view of a portion of the floor pan shown in FIG. 3.

FIG. 7 is an enlarged elevational view of an exemplary lower carpet system in accordance with an embodiment of the present disclosure.

FIG. 8 is an enlarged elevational view of a lower carpet system in accordance with another embodiment of the present disclosure.

FIG. 9 is a flow chart of an exemplary method of installing carpet in a vehicle.

Figure 1:
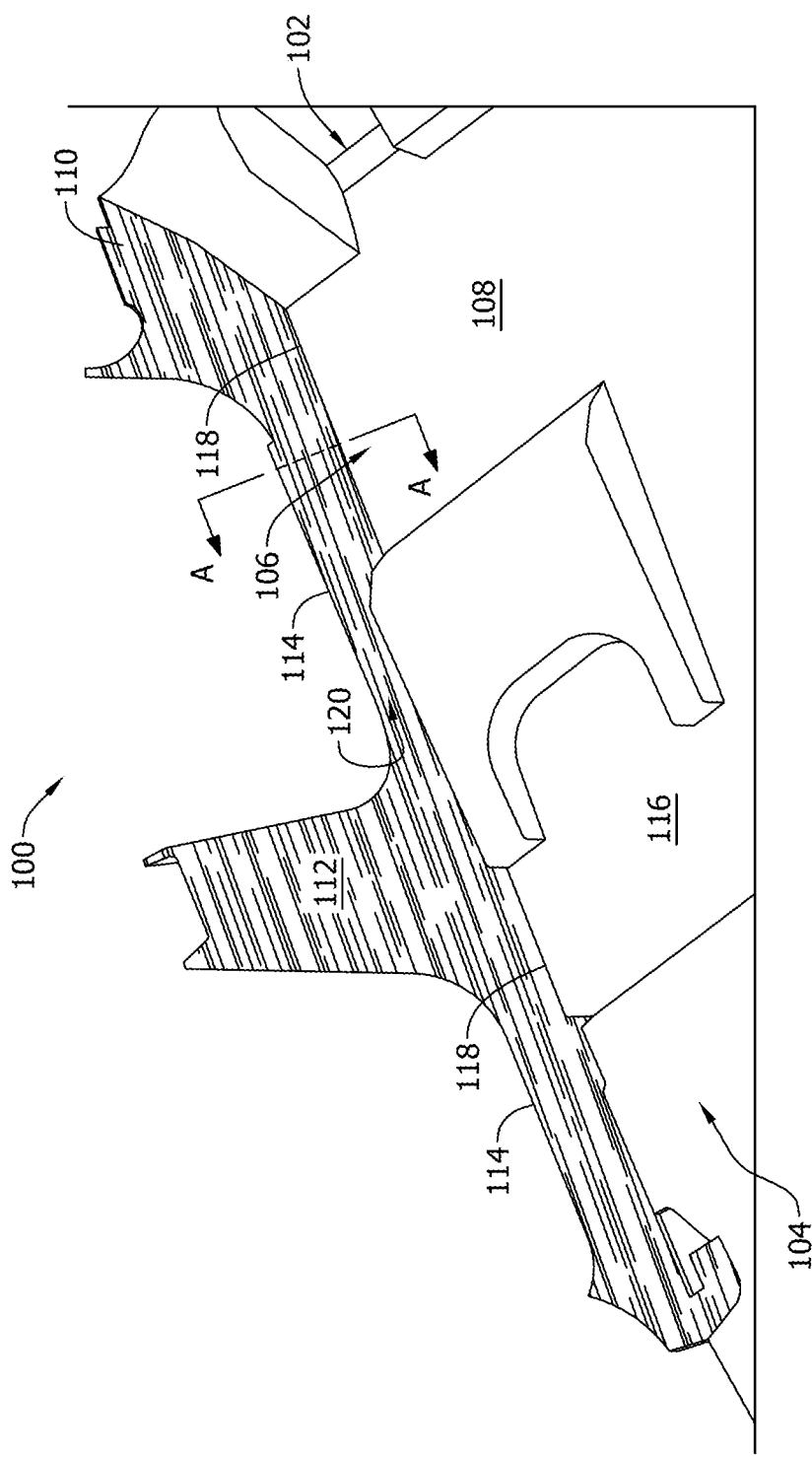

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates exemplary embodiments of the disclosure by way of example and not by way of limitation. It is contemplated that the disclosure has general application to maintaining trim components of any vehicle.

Embodiments of a vehicle carpeting system and methods of installing the vehicle carpeting system are described herein. In various embodiments, the vehicle carpeting system includes a floor pan that may be formed from a stamped metal sheet, such that it includes a forward end, an opposing aft end, a first lateral side, a second opposing lateral side, and a floor pan body extending therebetween. The floor pan may be formed as a metal pressing with a cross-sectional shape that facilitates increasing its stiffness. The sides of the floor pan may include formed inserts that provide a location for the wiring loom of an electrical system of the vehicle. An A-pillar may be formed along the first and second lateral sides of the floor pan, and a B-pillar may be formed along the first and second lateral sides of the floor pan, aft of the A-pillar. Other pillars may be formed or included aft of the B-pillar or in other locations along the first and/or second lateral sides. A ductway may extend along the first lateral side from the A-pillar, past the B-pillar, and terminate aft of the B-pillar. A carpet structure extends at least partially across the floor pan from the first lateral side to the second lateral side. The ductway may be formed from a U-shaped stiffened duct member coupled to the floor pan. The ductway may form an elongate cavity that extends under the carpet structure along at least one of the first lateral side and/or the second lateral side of the floor pan. The ductway may house a wiring harness, a ventilation conduit, and/or the like. A door seal includes a lip that extends over a lateral side of the carpet. The door seal has a narrow width that is not used as a step and thus does not cover the ductway.

In various embodiments, the door seal may extend along at least one of the first lateral side and the second lateral side. The door seal may include a flange clamp formed of, for example, a U-shaped channel having a base, two opposing sidewalls, and an opening extending along a single side of the U-shaped channel opposite the base. An inner surface of the U-shaped channel includes teeth that extend obliquely with respect to the sidewall into the U-shaped channel. The door seal may also include a collapsible elongate member that is sized to span a gap defined between a door of the vehicle and the flange clamp. The collapsible elongate member may be filled with a fluid and sealed from ambient, or may be perforated with openings that enable an interior of collapsible elongate member to be coupled in fluid communication with ambient. The door seal may also include a resilient lip that extends from the base in a direction away from the elongate member. The resilient lip extends over the carpet structure and applies a clamping force to facilitate retaining the carpet structure in position. In some embodiments, the flange clamp, the elongate member, and the resilient lip may be formed unitarily together. In other embodiments, one or more of the flange clamp, the elongate member, and the resilient lip may be individually formed and the separate components assembled together. The flange clamp is sized to receive at least one flange of a vehicle body panel and a flange of a hook member. The door seal is a relatively narrow strip that extends at the base of the door opening and as such, is not usable as a stepping area, and therefore will not receive repeated applications of dirt and gravel from a user's shoes, which mar the finish of the door seal.

The following description refers to the accompanying drawings, in which, in the absence of a contrary representation, the same numbers in different drawings represent similar elements.

FIG. 1 is a perspective view of a portion of a floor pan 100 of a known vehicle 101. In the exemplary embodiment, floor pan 100 is formed from a non-metallic material such as, resin, carbon fiber, fiberglass, and/or the like. In various embodiments, floor pan 100 is formed at least partially of a metallic material, such as, stamped sheet metal. Also in the exemplary embodiment, floor pan 100 includes a forward end 102, an opposing aft end 104, a first lateral side 106, a second lateral side (not shown in FIG. 1) opposing first lateral side 106, and a floor pan body 108 extending therebetween. Floor pan 100 also includes an A-pillar 110 extending along first lateral side 106, and similarly along the second lateral side of floor pan 100 adjacent to forward end 102. A B-pillar 112 extends along first lateral side 106 and the second lateral side of floor pan 100 aft of A-pillar 110. Each lateral edge 114 of floor pan 100 defines the outer lateral edge of floor pan 100. A carpet structure 116 extends over floor pan body 108 from a first carpet lateral edge 118 to a second carpet lateral edge (not shown in FIG. 1). A gap 120 is defined between lateral edge 114 and first carpet lateral edge 118. In various embodiments, gap 120 may be sized to accommodate a duct (not shown in FIG. 1). The duct may provide a protected space for a wiring harness, air duct, and/or the like.

Figure 2:
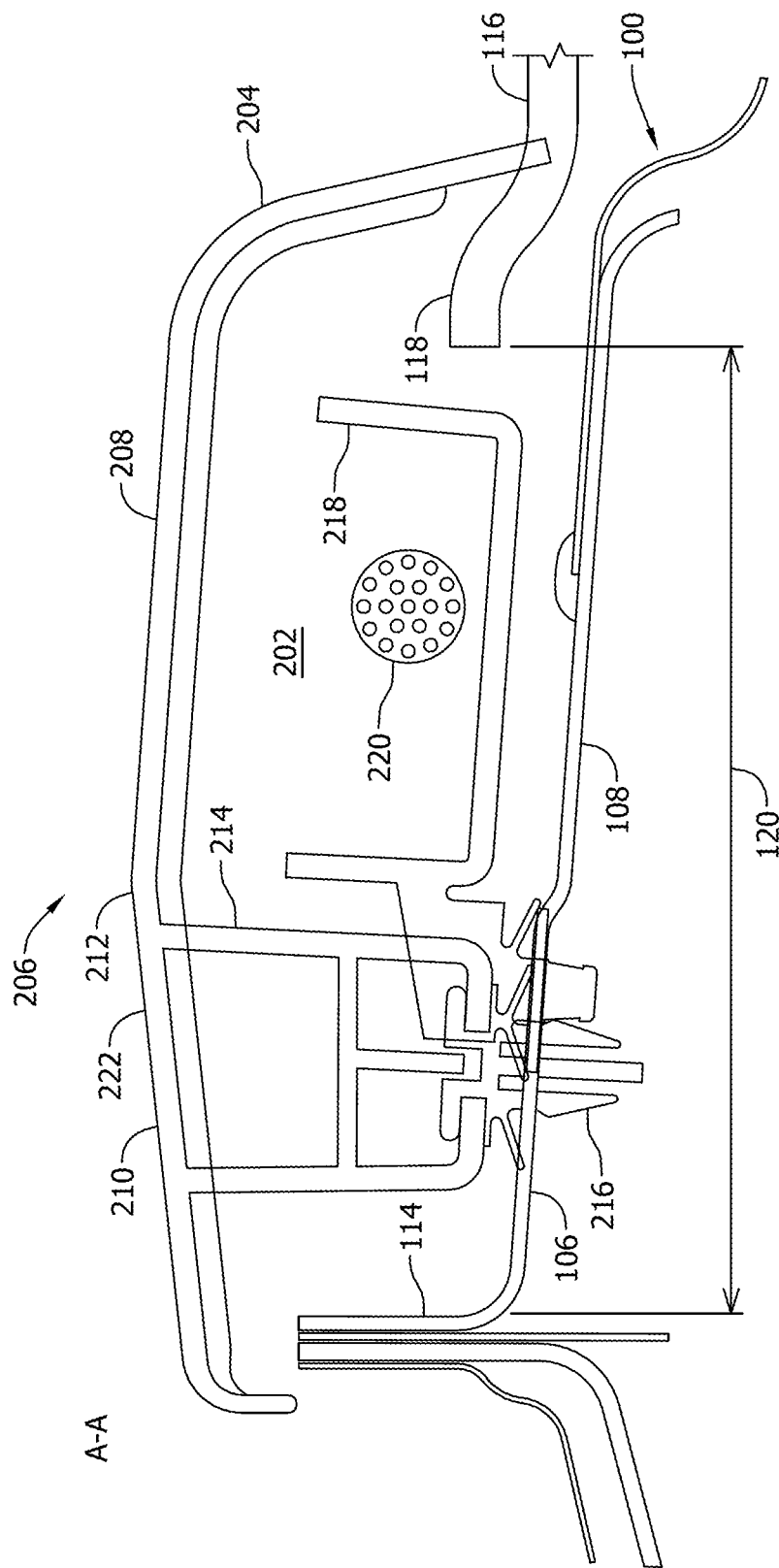

FIG. 2 is a cross-sectional view of first lateral side 106 of prior art floor pan 100 taken at section A-A (shown in FIG. 1) looking forward. In the exemplary embodiment, gap 120 is defined between lateral edge 114 and first carpet lateral edge 118. Covering gap 120 and forming a cavity or duct 202, a step assembly 204 extends along lateral edge 114 between edges 114 and 118. Step 204 includes a base 206 having a first substantially planar base section 208, a second substantially planar base section 210, and an apex 212 therebetween. Base sections 208 and 210 may be slightly inclined with respect to floor pan body 108 to promote gravity of water or debris from step assembly 204. Step assembly 204 includes a connection member 214 that extends into duct 202 in proximity to floor pan body 108. A clip 216 is used to couple step assembly 204 to floor pan body 108. Duct 202 may include a harness pan 218 within duct 202 that is sized and oriented to support and channel a wiring harness 220 through duct 202. Such an orientation, however, may lead to a perennially soiled, scuffed, and/or marred surface 222 of step assembly 204, which may be unsightly and/or lead to dissatisfaction of the overall esthetics of vehicle 101.

Figure 3:
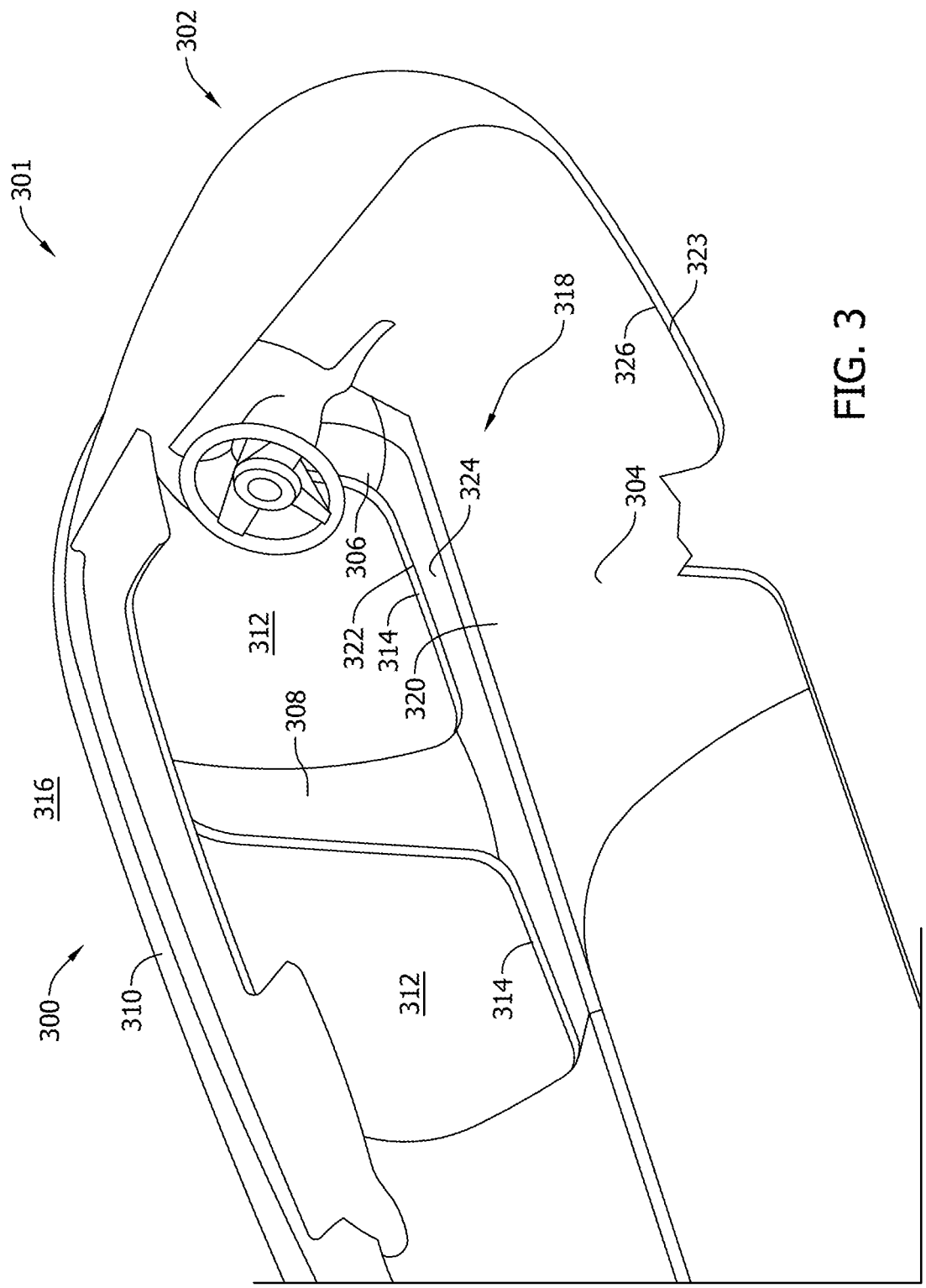

FIG. 3 is a perspective view of a portion of a vehicle 300. In the exemplary embodiment, vehicle 300 includes a driver's side 301 and a passenger's side 302. Vehicle 300 further includes a floor pan 304 that includes at least an A-pillar 306 and a B-pillar 308 extending substantially vertically therefrom. A roof member 310 covers vehicle 300. Floor pan 304, A-pillar 306 B-pillar 308, and roof member 310 cooperate to define an opening 312 sized for example, to receive a vehicle door and window (not shown in FIG. 3), for example. To facilitate at least partially weather-proofing vehicle 300, a door seal 314 circumscribes opening 312 to provide a weather-resistant seal extending between ambient 316 and an interior 318 of vehicle 300.

A carpet structure 320 extends over floor pan 304 from a lateral edge 322 of floor pan 304 on driver's side 301 to a lateral edge 323 of floor pan 304 on passenger's side 302. In the exemplary embodiment, carpet structure 320 is sized to extend between lateral edge 322 and passenger side lateral edge 323 without leaving a gap between a driver's side lateral edge 324 of carpet structure 320 and lateral edge 322 and a passenger side lateral edge 326 of carpet structure 320 and lateral edge 323 of floor pan 304.

FIG. 4 is a plan view of floor pan 304 with exploded portions, including door sill stiffeners 402 and door seals 314. FIG. 5 is a perspective view of floor pan 304 and a lower body 404 of vehicle 300.

Figure 6:
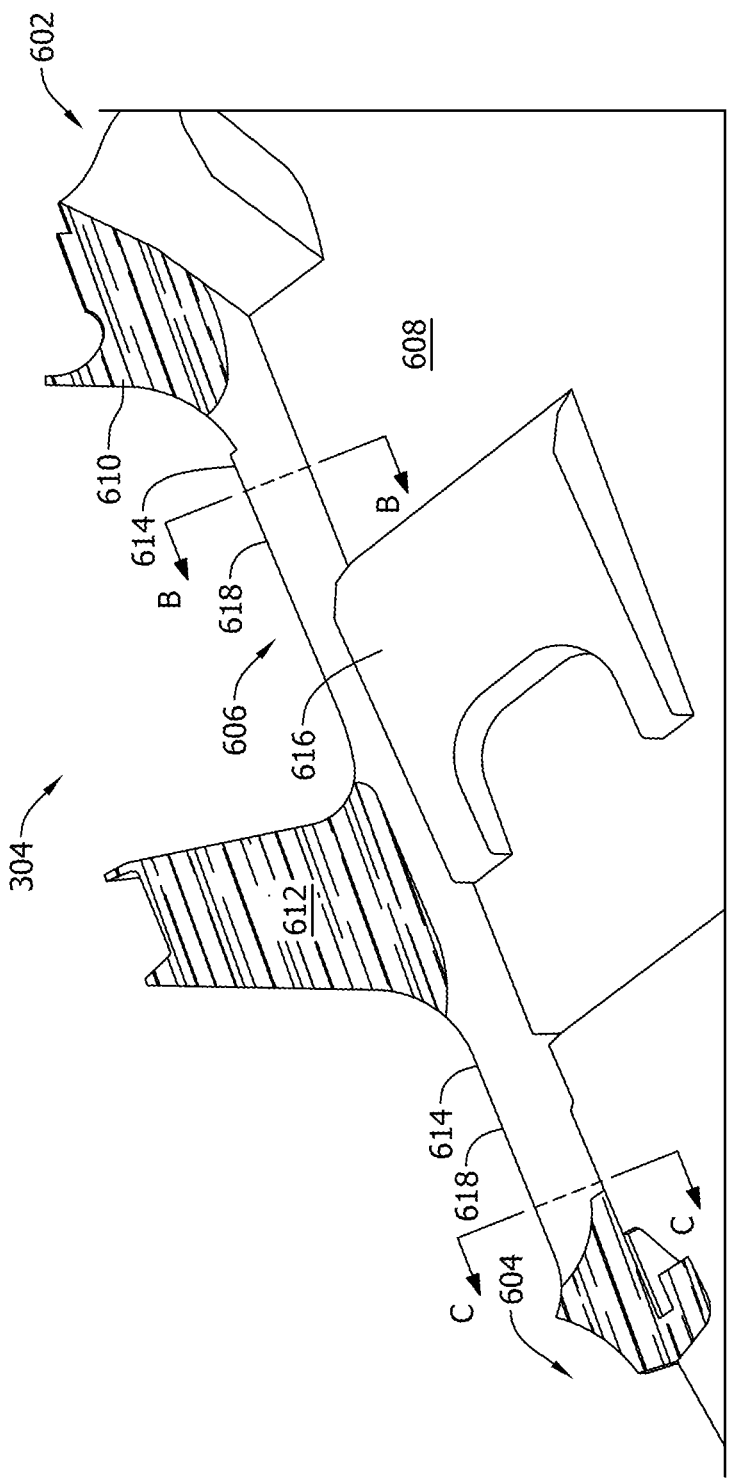

FIG. 6 is a perspective view of a portion of floor pan 304. In the exemplary embodiment, floor pan 304 is formed from a non-metallic material such as, resin, carbon fiber, fiberglass, and the like. In various embodiments, floor pan 304 is formed at least partially of a metallic material, such as, stamped sheet metal. Also in the exemplary embodiment, floor pan 304 includes a forward end 602, an opposite aft end 604, a first lateral side 606, a second lateral side (not shown in FIG. 6) opposing first lateral side 606, and a floor pan body 608 extending between first lateral side 606 and the second lateral side (not shown in FIG. 6) of floor pan 304. Floor pan 304 also includes an A-pillar 610 formed along first lateral side 606 and similarly along the second lateral side of floor pan 304 adjacent to forward end 602. A B-pillar 612 is formed along first lateral side 606 and the second lateral side of floor pan 304 aft of A-pillar 610. Each lateral edge 614 of floor pan 304 defines the outer lateral edge of floor pan 304 extends. Carpet structure 320 extends over floor pan body 608 from a first carpet lateral edge 618 to a second carpet lateral edge (not shown in FIG. 6). In the exemplary embodiment shown in FIG. 6, there is no gap formed between lateral edge 614 and first carpet lateral edge 618.

Figure 7:
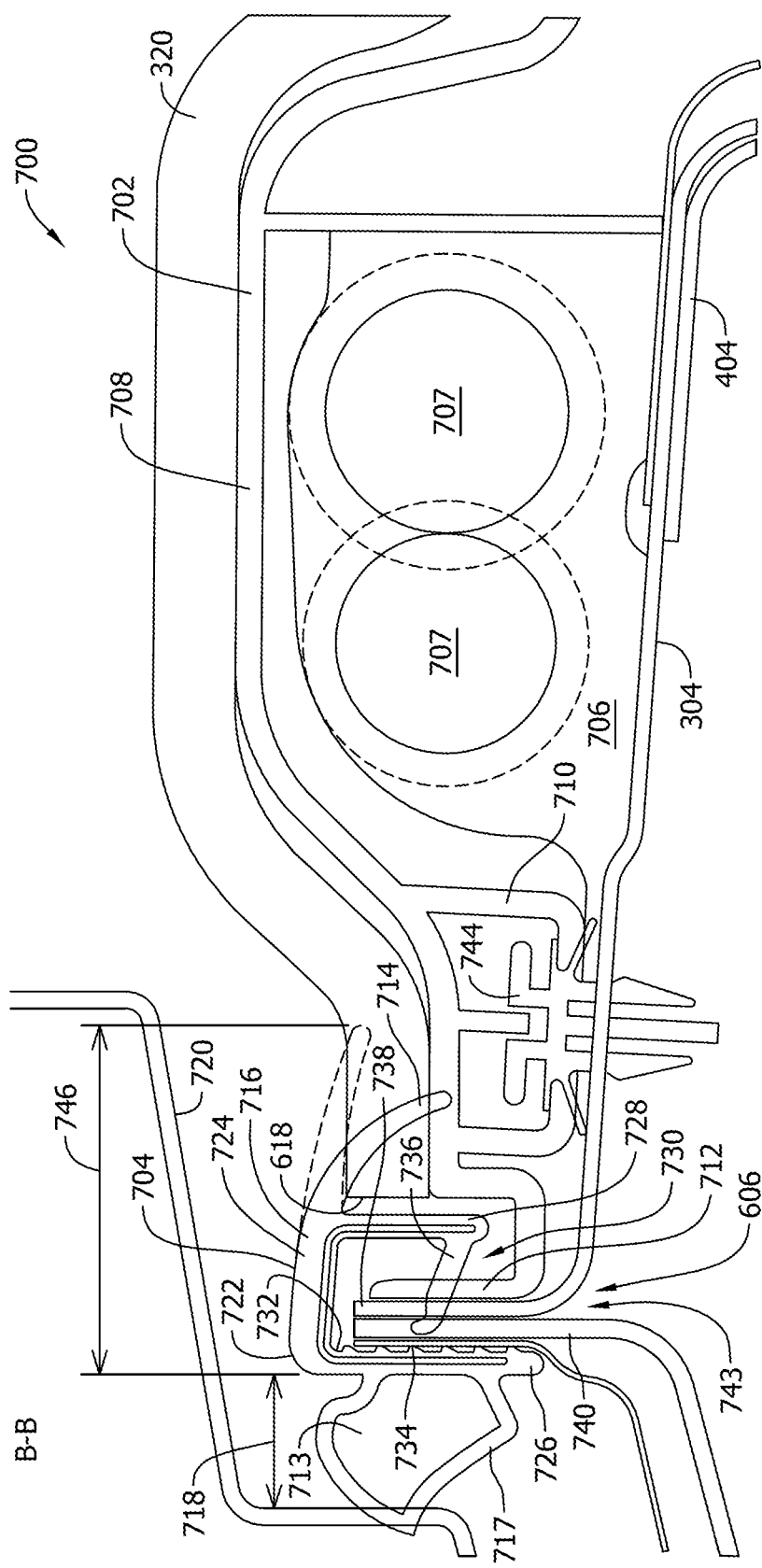

FIG. 7 is a cross-sectional view along a section B-B (shown in FIG. 6) of a lower carpet system 700 in accordance with an exemplary embodiment of the present disclosure. In the exemplary embodiment, lower carpet system 700 includes an elongate stiffened duct member 702 that extends substantially parallel to and alongside first lateral side 606. Lower carpet system 700 also includes a door seal 704. Stiffened duct member 702 includes a cavity or duct 706, an upper ductway member 708, a connection member 710 extending from upper ductway member 708 towards floor pan 304, and a flange hook 712 extending from and away from upper ductway member 708. Stiffened duct member 702 is oriented to guide carpet structure 320 over duct 706. Duct 706 may be sized to enable passage of a cable harness 707 therethrough that may extend from a forward end 602 of vehicle 300 aftward. In other embodiments, duct 706 is used to channel a flow of conditioned air to vents spaced about interior 318.

In the exemplary embodiment, door seal assembly 704 is a unitarily-formed ring that is sized and oriented to circumscribe opening 312 (shown in FIG. 3). In cross-section, door seal 704 includes a sealing cavity 713, a resilient lip 714 that extends over a lateral edge 618 of carpet structure 320, and a flange clamp 716. Sealing cavity 713 is formed from a resilient material formed into a tube-like member 717 sized to substantially fill any gap 718 created between a door lining 720 and flange clamp 716. Sealing cavity 713 may be filled with a gas or gel and sealed from ambient or may have perforations (not shown) extending through tube-like member 717 to permit the ingress and egress of ambient air. Tube-like member 717 may seal as it is compressed between flange clamp 716 and door lining 720 or may seal by being deflected away from its quiescent position. In the exemplary embodiment, flange clamp 716 includes a substantially U-shaped channel 722 defined by a base 724 and two opposing sidewalls 726 and 728. An opening 730 extends along a side of U-shaped channel 722 opposite base 724. An inner surface 732 of U-shaped channel 722 includes a plurality of gripping teeth 734 that extend into U-shaped channel 722 obliquely with respect to inner surface 732. Additionally, opening 730 is at least partially covered by a resilient latch 736.

During assembly, a flange 738 of floor pan 304, a flange 740 of a body panel 742, and flange hook 712 cooperate and may be coupled together temporarily or permanently to form a flange assembly 743. Stiffened duct member 702, with flange hook 712 positioned adjacent flange 738 and flange 740, is coupled to floor pan 304 using fasteners 744 that are spaced apart. For example, fasteners 744 may include a clip, as shown in FIG. 7. Carpet structure 320 extends over floor pan 304 with respective lateral edges 324 and 326 of carpet structure 320 adjacent flange hook 712. Door seal 704 is positioned with opening 730 over flange assembly 743 and is then pressed onto flange assembly 743. Gripping teeth 734 and resilient latch 736 engage flange assembly 743. As door seal 704 becomes seated on flange assembly 743, resilient latch 736 deflects into U-shaped channel 722 capturing flange assembly 743 in a clamp-like grip. Additionally, as door seal 704 is seated on flange assembly 743, lip 714 engages first carpet lateral edge 618 causing lip 714 to deflect and induce a force to first carpet lateral edge 618 thereby clamping it to upper ductway member 708 adjacent to connection member 710 and flange hook 712. Although only described in terms of driver's side 301, all descriptions also apply to passenger's side 302 as well. A width 746 of door seal assembly 704 is relatively narrow and is Although door seal assembly 704 may be fabricated from a plastic and/or other resilient material which can be scuffed and/or marred, because door seal assembly 704 is relatively narrow, the unsightly appearance often associated with prior art step assembly 204 (shown in FIG. 2) is substantially reduced.

Figure 8:
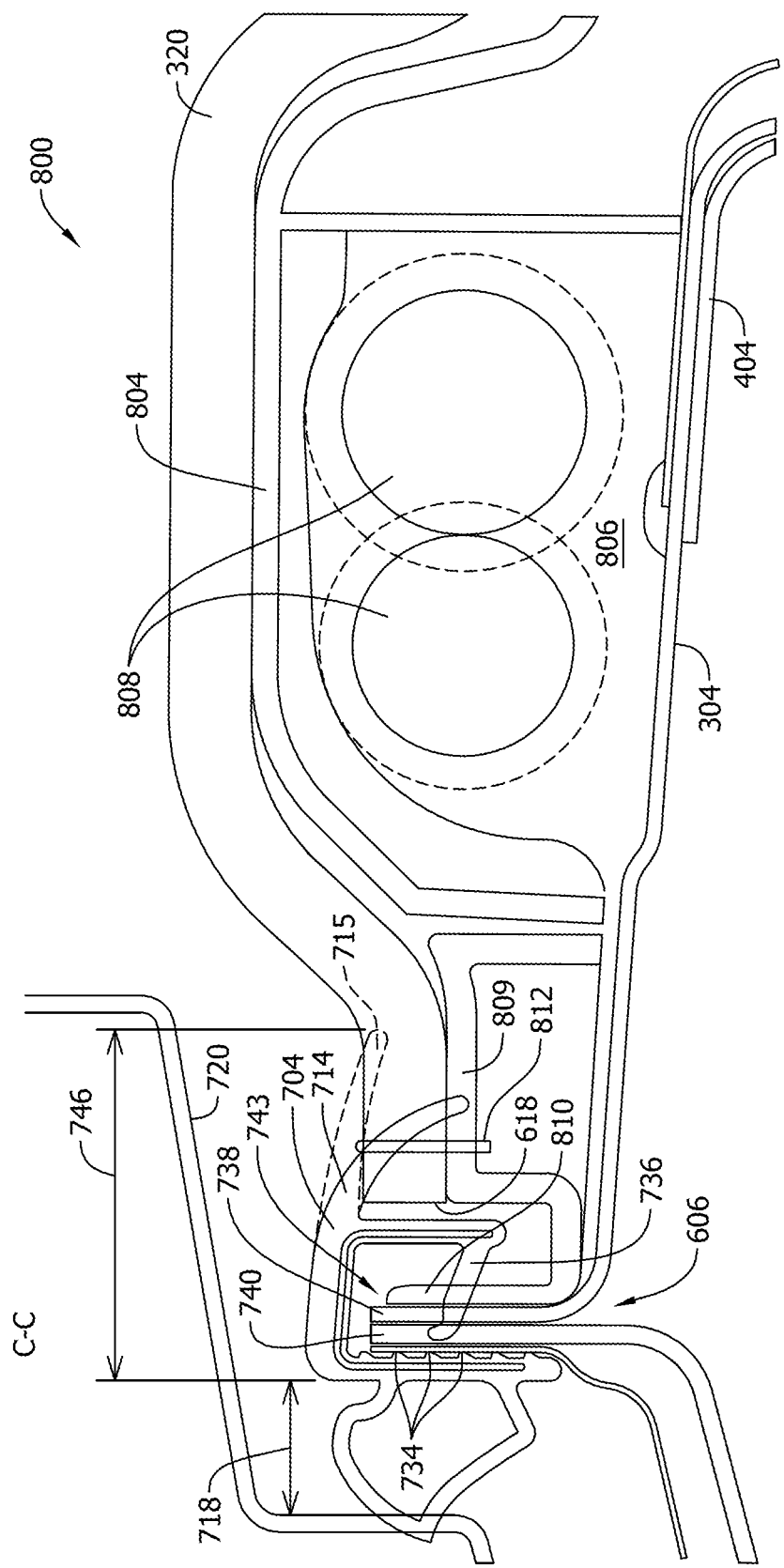

FIG. 8 is a cross-sectional view along a section C-C (shown in FIG. 6) of a lower carpet system 800 in accordance with an exemplary embodiment of the present disclosure. In the exemplary embodiment, lower carpet system 800 includes a stiffened duct member 802 that extends substantially parallel to, and alongside, first lateral side 606. In the exemplary embodiment, stiffened duct member 802 is fabricated from a plurality of members. For example, in the exemplary embodiment, a first duct member 804 forms a cavity 806 sized to enable passage of a cable harness 808 therethrough that may extend from a forward end 602 of vehicle 300 aftward. In other embodiments, cavity 806 is used to channel a flow of conditioned air to vents spaced about interior 318. Stiffened duct member 802 may also include a second connection member 809 including a flange hook 810. Second connection member 809, with flange hook 810 positioned adjacent to flange 738 and flange 740 couples to carpet structure 320 using spaced-apart fasteners such as, but not limited to, staples 812. Gripping teeth 734 and resilient latch 736 engage flange assembly 743 to maintain flange hook 810 and second connection member 809 in a fixed position relative to floor pan 304. Such an orientation facilitates anchoring carpet structure 320 to second connection member 809. Carpet structure 320 overlays first duct member 804 to facilitate maintaining first duct member 804 in a fixed position relative to floor pan 304. Door seal assembly 704, in the exemplary embodiment also has a relatively narrow width 746 and is fabricated from plastic and/or other resilient material, which can be scuffed and marred, thereby also substantially reducing the unsightly appearance associated with prior art step assembly 204 (shown in FIG. 2). In various embodiments, second connection member 809 is stapled to carpet structure 320 prior to installation of carpet structure 320 in vehicle 300. During assembly first duct member 804 may be coupled to floor pan 304, and then carpet structure 320 may be positioned over first duct member 804 and second connection member 809 may be positioned between first duct member 804, which facilitates aligning carpet structure 320 during instalation.

In various embodiments, lower carpet system 700 may be installed in specific areas where connection member 710 is able to be used. For example, because fastener 744 penetrates floor pan 304, there may be areas where components are positioned just below floor pan 304 that would be adversely affected by a fastener 744 penetrating floor pan 304 in that area. In such an area, lower carpet system 800 may be more appropriate. Each vehicle may utilize one or more of lower carpet system 700 and lower carpet system 800 as needed to accommodate each vehicle's particular configuration.

Figure 9:
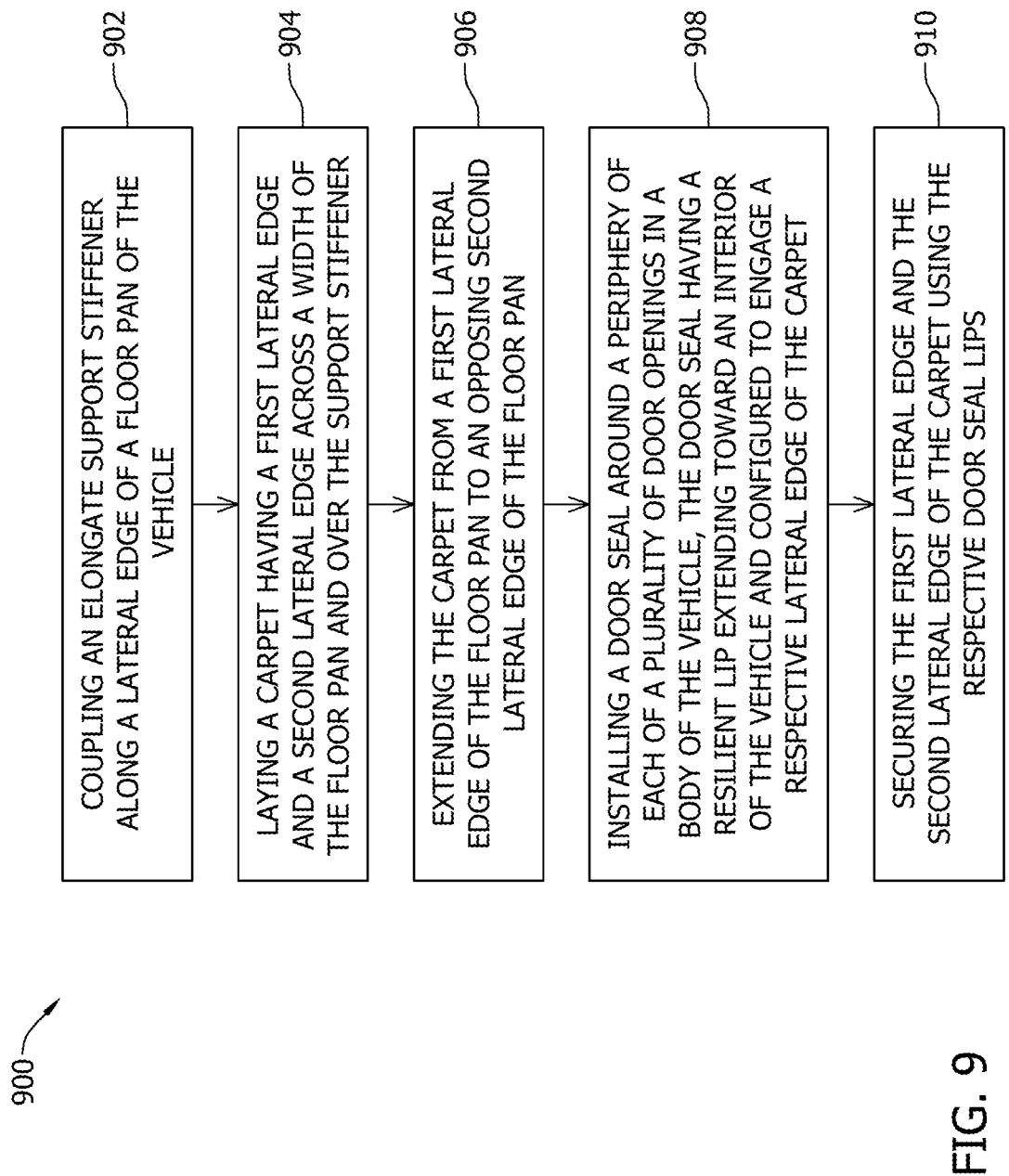

FIG. 9 is a flow chart of an exemplary method 900 of installing carpet, such as carpet structure 320 in vehicle 300 (shown in FIG. 3). In the exemplary embodiment, method 900 includes coupling 902 stiffened duct member 702 along a lateral edge 322 of floor pan 304 of vehicle 300 and laying 904 a carpet having a first lateral edge 324 and a second lateral edge 326 across a width of floor pan 304 and over stiffened duct member 702. Method 900 also includes extending 906 carpet structure 320 from first lateral edge 322 of the floor pan 304 to opposite second lateral edge 323 of the floor pan 304 and installing 908 door seal 314 around a periphery of each of a plurality of door openings 312 in vehicle 300. Door seal 314 includes resilient lip 714 extending toward interior 318 of vehicle 300 and is configured to engage a respective lateral edge 324 and 326 of carpet structure 320. Method 900 further includes securing 910 the first lateral edge 324 and the second lateral edge 326 of carpet structure 320 using the respective door seal lips 714.

Optionally, coupling an elongate stiffened duct member 702 along a lateral edge 322 and/or 323 of floor pan 304 of vehicle 300 may include running a cable harness 707 in a cavity 706 extending through elongate stiffened duct member 702. Also optionally, first lateral edge 324 and the second lateral edge 326 of carpet structure 320 may be secured using the respective door seal lips 714 by sandwiching first lateral edge 324 and second lateral edge 326 of carpet structure 320 between resilient lip 714 and stiffened duct member 702. In various embodiments, stiffened duct member 702 may include second connection member 809 extending alongside stiffened duct member 702 and first lateral edge 324 and the second lateral edge 326 of carpet structure 320 may be secured using the respective door seal lips 714 by sandwiching the first lateral edge 324 and the second lateral edge 326 of the carpet structure 320 between the resilient lip 714 and second connection member 809.

Embodiments of the carpet systems described herein facilitate reducing carpet trim in the door sill area. For example, embodiments of the carpet system utilize a relatively narrow door seal assembly in place of a relatively wide duct-covering step. The relatively narrow door seal assembly does not receive the foot of a user because it is not in a natural step area and because the door seal base is narrow, a smaller portion of the user's foot is able to contact the door seal. This is important because it is the user's foot that carries the particles that tend to mar the surface of the step, which makes it unsightly.

The foregoing detailed description illustrates embodiments of the disclosure by way of example and not by way of limitation. It is contemplated that the disclosure has general application to maintaining an appearance of the vehicle interior trim and in other commercial and industrial environments. It is further contemplated that the methods and systems described herein may be incorporated into existing assembly lines, in addition to being maintained as a separate stand-alone capability.

The above-described embodiments of a method and system of installing a carpet system in a vehicle provides a cost-effective and reliable means for maintaining necessary cable or conditioned air runs available while facilitating reducing wear and tear on esthetic aspects of the vehicle. More specifically, the methods and systems described herein facilitate replacing a plastic step having a relatively large width in the threshold of the vehicle doorway with a narrow door seal assembly that does not form a step area. As a result, the methods and systems described herein facilitate reducing customer dissatisfaction and complaints with respect to in a cost-effective and reliable manner.

Exemplary embodiments of vehicle carpet systems are described herein. The systems and methods are not limited to the specific embodiments described herein, but rather, components of the systems and/or steps of the methods may be utilized independently and separately from other components and/or steps described herein.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle carpeting system comprising:
   a floor pan comprising:
     a forward end, an opposite aft end, a first lateral side, a second lateral side, and a floor pan body extending between said first lateral side and said second lateral side;
   an A-pillar positioned along said first lateral side and said second lateral side of said floor pan,
   a B-pillar positioned along said first lateral side and said second lateral side of said floor pan aft of said A-pillar;
   a ductway extending along said first lateral side from said A-pillar past said B-pillar above said floor pan body, said ductway formed from a U-shaped stiffened duct member coupled to said floor pan, said U-shaped stiffened duct member defined by a pair of opposed sidewalls and a lateral wall extending between said pair of sidewalls;
   a carpet structure including a first carpet lateral edge and an opposite second carpet lateral edge, said carpet structure extending at least partially over said floor pan from said first lateral side of said floor pan body to said second lateral side of said floor pan body, said duct member lateral wall oriented to guide said carpet structure over said ductway to said floorpan lateral edge; and a door seal comprising a lip that extends over at least one of said first carpet lateral edge and second carpet lateral edge.

2. The vehicle carpeting system of claim 1, wherein said ductway comprises an elongate cavity extending along at least one of said first lateral side and said second lateral side between said floor pan body and said carpet structure.

3. The vehicle carpeting system of claim 1, wherein said ductway comprises a wiring harness.

4. The vehicle carpeting system of claim 1, wherein said ductway comprises a ventilation conduit.

5. The vehicle carpeting system of claim 1, wherein said floor pan body comprises a stamped metal sheet.

6. The vehicle carpeting system of claim 1, wherein said door seal extends along at least one of said first lateral side and said second lateral side, said door seal comprises:

a flange clamp comprising a U-shaped channel having a base, two opposing sidewalls, and an opening extending along a single side of said U-shaped channel opposite said base, an inner surface of said U-shaped channel having teeth extending into said U-shaped channel at an oblique angle with respect to said sidewall;

a collapsible elongate member sized to span a gap between a door of the vehicle and said flange clamp; and a resilient lip extending from said base in a direction away from said elongate member, said resilient lip configured to extend over said carpet structure.

7. The vehicle carpeting system of claim 6, wherein said flange clamp, said elongate member, and said resilient lip are unitarily formed.

8. The vehicle carpeting system of claim 6, wherein said flange clamp is configured to receive at least one flange of a vehicle body panel.

9. The vehicle carpeting system of claim 8, wherein said flange clamp is further configured to receive a flange of a hook member.

10. The vehicle carpeting system of claim 6, wherein said collapsible elongate member comprises a collapsible gas-filled elongate member.

* * * * *